(12) United States Patent
Hata

(10) Patent No.: US 6,917,803 B2
(45) Date of Patent: Jul. 12, 2005

(54) WIRELESS COMMUNICATIONS EQUIPMENT

(75) Inventor: Yoshiyuki Hata, Tokyo (JP)

(73) Assignee: Hitachi Kokusai Electric Inc., Tokyo (JP)

(*) Notice: Subject to any disclaimer, the term of this patent is extended or adjusted under 35 U.S.C. 154(b) by 444 days.

(21) Appl. No.: 10/277,871

(22) Filed: Oct. 23, 2002

(65) Prior Publication Data
US 2003/0153294 A1 Aug. 14, 2003

(30) Foreign Application Priority Data
Feb. 14, 2002 (JP) ......................... 2002-036279

(51) Int. Cl.[7] ............................................. H04Q 7/20
(52) U.S. Cl. ................ 455/426.2; 455/67.13; 455/311; 455/323
(58) Field of Search ............... 455/67.11, 67.13, 455/63.1, 296, 307, 311, 313, 323, 260, 426.2

(56) References Cited

U.S. PATENT DOCUMENTS 5,507,017 A * 4/1996 Whitmarsh et al. ......... 455/126
5,724,380 A * 3/1998 Ritter .......................... 455/62
6,032,032 A * 2/2000 Kato et al. .................. 455/266
6,728,321 B2 * 4/2004 Neubauer et al. ........ 455/179.1

* cited by examiner

Primary Examiner—Quochien B. Vuong
(74) Attorney, Agent, or Firm—Wenderoth, Lind & Ponack, L.L.P.

(57) ABSTRACT

Wireless communications equipment that wirelessly communicates signals on a plurality of communication frequencies includes: a baseband frequency-side frequency conversion means that performs conversion between baseband signals on the baseband frequency and signals on a stipulated frequency higher than the baseband frequency and different from the intermediate frequency, an intermediate frequency-side frequency conversion means that performs conversion between the signals on said stipulated frequency and intermediate frequency signals on a plurality of intermediate frequencies corresponding to a plurality of communication frequencies, and an unwanted frequency signal component removal means that removes signal components of unwanted frequencies from the signals on said stipulated frequency. Thus, it is possible to share the components used for the removal of unwanted frequency signal components for the intermediate frequency signals of a plurality of intermediate frequencies, and thus the cost and unit size can be reduced.

18 Claims, 8 Drawing Sheets

| CH | Central frequency (f2-f8) | Local frequency (L2-L8) |
|---|---|---|
| CH1 | 114.29MHz | 439.29 MHz |
| CH2 | 122.86 MHz | 447.86 MHz |
| CH3 | 131.43 MHz | 456.43 MHz |
| CH4 | 140 MHz | 465 MHz |
| CH5 | 148.57 MHz | 473.57 MHz |
| CH6 | 157.14 MHz | 482.14 MHz |
| CH7 | 165.71 MHz | 490.71 MHz |

Fig.4

WIRELESS COMMUNICATIONS EQUIPMENT

BACKGROUND OF THE INVENTION

1. Field of the Invention

This invention relates to wireless communications equipment that performs conversion between baseband signals at a baseband frequency and intermediate frequency signals of a plurality of intermediate frequencies, and particularly to wireless communications equipment of Fixed Wireless Access (FWA) systems that improves the efficiency of a configuration that performs this conversion.

2. Description of the Prior Art

In FWA systems, for example, development is now proceeding rapidly on point-to-point and point-to-multipoint circuit configurations in subscriber wireless access systems that utilize the millimeter-wave band. Subscriber wireless access is also called Wireless Local Loop (WLL) or the like.

In addition, the Time Division Duplex (TDD) communications technique is used in mobile telephony and other systems, and is known to be a technique wherein sending and receiving are performed alternately in time division.

In addition, the next-generation broadband FWA systems consist of subscriber wireless equipment called nodes disposed in a lattice shape (mesh shape) in a city or the like. In addition, these systems are built using autonomous route selection technology that predicts the radio-wave propagation situation depending on the direction and strength of the radio waves received by each node and autonomously selects a channel and direction of radiation with no interference that is usable for transmission, technology that constantly monitors the usage situation and circuit quality of the links among nodes to select the optimal route among a plurality of routes, and wireless routine technology that selects the optimal route in a mesh network architecture for performing communications. This configuration is being adopted in order to construct novel FWA systems. In addition, in order to increase the information transmission speeds, the next-generation broadband FWA systems adopt multiplexing technology whereby, in communication among heavily loaded nodes, sending and receiving is performed by using a bunch of several wireless channels, of which a plurality are prepared on the frequency axis.

FIG. 7 presents an example of a configuration of a frequency conversion circuit in the case that a frequency conversion circuit is constructed in next-generation broadband FWA units using the prior art. The frequency conversion circuit shown in the figure consists of: a signal processor 41, band pass filter (BPF) 42, phase-locked loop (PLL) 43, mixer 44, amplifier (AMP) 45, single-pole six-throw (SP6T) switch 46, six surface acoustic wave (SAW) filters F1–F6, a SP6T switch 47, transmitter power controller 48, TDD switch 49, intermediate frequency (IF) signal input/output pin 50, amplifier 51, SP6T switch 52, six SAW filters F11–F16, a SP6T switch 53, mixer 54 and an automatic gain control (AGC) amplifier 55.

In addition, FIG. 8 shows an example of frequency conversion performed by the frequency conversion circuit shown in FIG. 7. In FIG. 8, the horizontal axis is the frequency and the vertical axis is the power. FIG. 8 shows the baseband signals at the baseband frequency $f_0$, intermediate frequency signals at six intermediate frequencies $f_1$–$f_6$, signals at carrier leak frequencies $L_1$–$L_6$ and signals at image frequencies $I_1$–$I_6$ corresponding to each of the intermediate frequency signals. Note that for i=1–6, $f_i=f_0+L_i$ and $I_i=L_i-f_0$.

In the following description, we shall make reference to FIGS. 7 and 8 to illustrate one example of the signal processing performed by the frequency conversion circuit shown in FIG. 7.

The signal processor 41 performs digital quadrature modulation of the transmission signal to generate a quadrature modulated wave which has a relatively low frequency of $f_0$.

In addition, the signal processor 41 uses a control signal to control the PLL 43, and the PLL 43 generates a signal at the controlled frequency (here, one of $L_1$–$L_6$) which is output to the two mixers 44 and 54.

In addition, the signal processor 41 uses control signals to control the four SP6T switches 46, 47, 52 and 53, transmitter power controller 48 and AGC amplifier 55, and also uses timing signals to control the TDD switch 49.

The send signals at the frequency of $f_0$ generated by the signal processor 41 (here, the baseband signals) are subjected to removal of spurious emissions by the BPF 42 and then converted by the mixer 44 to an intermediate frequency signal at one of the frequencies $f_1$–$f_6$ which are the intermediate frequencies. Thereafter, the send signals converted to an intermediate frequency are amplified by the amplifier 45 and output to the SAW filter (one of F1–F6) corresponding to the intermediate frequency selected by the SP6T switch 46 which is switched under the control of the signal processor 41.

The six SAW filters F1–F6 correspond to each of the six central frequencies $f_1$–$f_6$, and if the send frequency (here, the central frequency) is $f_1$, for example, the SAW filter F1 which has a central frequency of $f_1$ is selected. Each of the SAW filters F1–F6 removes the signals at the carrier leak frequencies $L_1$–$L_6$ and the signals at the image frequencies $I_1$–$I_6$, which are spurious emissions in the send signals, and outputs the send signals with these signals removed to the transmitter power controller 48 via the SP6T switch 47.

The transmitter power controller 48 increases or decreases the transmitter power of the send signals under the control of the controller (here, the signal processor 41) and outputs the send signals after power control to the TDD switch 49. Under the control of the controller (signal processor 41), the TDD switch 49 switches the signal system between a system for sending and a system for receive depending on whether sending or receiving is to be done. At the time of sending, the TDD switch 49 is switched to the transmitter power controller 48 side and outputs the send signals to the IF signal input/output pin 50.

Note that when performing digital quadrature modulation, with the current level of devices, the limit from a cost and hardware standpoint lies at handling modulation waves below 50 MHz. This fact means that during sending, the local leak (carrier leak) frequency and image frequency are generated at relatively close areas detuned by less than 50 MHz from the central frequency of the main signal, so it is necessary to use a filter such as a SAW filler that has a steep skirt characteristic.

In addition, in the next-generation broadband FWA for example, the use of high order modulation (1024 QAM) is under consideration, and in this case, the conventional analog quadrature modulation methods do not give adequate modulation precision so interference between symbols occurs and practical application is difficult. For this reason, in the next-generation broadband FWA systems, it has been necessary to select digital quadrature modulation.

On the other hand, during receiving, the TDD switch 49 is switched to the amplifier 51 side and the received signal (here, the intermediate frequency signal) input from the IF signal input/output pin 50 is output to the receiving amplifier 51 via the TDD switch 49. This received signal is a signal that has one of the frequencies among the six central frequencies $f_1$–$f_6$, and after being amplified by the amplifier 51, in the same manner as on the sending side, under the control of the controller (here, the signal processor 41) for two SP6T switches 52 and 53, the signal is caused to pass through the SAW filter (one of F11–F16) for the appropriate frequency (one of $f_1$–$f_6$) and the spurious emissions and image signals are removed.

Thereafter, the received signal is converted by the mixer 54 to a baseband signal with a central frequency of $f_0$ and output to the AGC amplifier 55. Based on control signals from the controller (here, the signal processor 41) the AGC amplifier 55 is subjected to feedback control such that the output power value is constantly kept at the target power value, and thus the baseband signal obtained from the received signal is output to the signal processor 41 at a constant power. The signal processor 41 subjects the received signal input as a baseband signal to digital quadrature detection, thereby demodulating it to the original information.

As indicated by the example of configuration and example of operation of the frequency conversion circuits of the next-generation broadband FWA units constituted using the prior art illustrated above, the input/output frequency $f_0$ of the signal processor 41 becomes the baseband frequency during both sending and receiving. In addition, the send/receive frequency (here, the central frequency) is one of $f_1$–$f_6$ and if f, for example, by adding the oscillation frequency from PLL 43 as the frequency $L_1$ ($L_1 = f_1 - f_0$) and the signal of this frequency $L_1$ as the local signal to mixers 44 and 54, during sending, the baseband signal with the baseband frequency $f_0$ is converted to the intermediate frequency signal with the intermediate frequency $f_1$, but during receiving, the intermediate frequency signal with the intermediate frequency $f_1$ is converted to the baseband signal with the baseband frequency $f_0$.

Note that a FWA unit is typically divided into the indoor unit (IDU) and outdoor unit (ODU), and the portion of the configuration shown in FIG. 7 corresponds to the portion of the configuration of the indoor unit. The IDU and ODU may be communicably connected by coaxial cable, for example, and the intermediate frequency used can be a low frequency in the 70 MHz band or 140 MHz band that is relatively unaffected by losses due to the coaxial cable, for example. In addition, the ODU performs frequency conversion between the intermediate frequency signals of the intermediate frequency and the signals in the radio frequency (RF) which is the millimeter-wave band, and emits radio waves from the antenna and receives radio waves with the antenna.

As an example, an FWA unit may consist of a base station unit and a subscriber station unit. In this case, the base station unit and subscriber station unit may each consist of an outdoor unit installed in a fixed location on the top of a building or tower or other high place and an indoor unit installed within the building or the like, and connected by cable. Moreover, the outdoor unit of the base station unit or subscriber station unit is equipped with a wireless processor that performs the processing of wireless communications using an antenna by mainly controlling the processing of wireless communications. In addition, the indoor unit of the base station unit mainly controls data communications with the backbone network, while the indoor unit of the subscriber station unit mainly controls data communications with personal computers or other communications terminal units or a LAN or the like.

In addition, for reference, we shall also introduce an example of prior art pertaining to frequency conversion.

The "transceiver for wireless communication equipment" recited in the publication of unexamined Japanese patent application JP-A-10-93476 uses a configuration provided with a local signal generation means with an n-stage configuration (n is an integer equal to 2 or greater) that supplies send local signals and receive local signals each synchronized to one of n contiguous slots in the TDMA-TDD protocol, along with a double superheterodyne configuration wherein frequency conversion is performed in two stages in the same direction of lowering the frequency, and a configuration wherein filters are shared between sending and receiving. Note that in comparison with the present invention to be presented below, the function of sharing filters between sending and receiving (e.g., frequency band) and its object differ from those of the present invention, and the object of two-stage frequency conversion differs from that of the present invention. This also differs from the present invention on the point that it does not have the configuration of mixers and filters and combination of mixers used in the present invention. In addition, this differs from the present invention on the point that it is thought to be difficult to apply to a FWA system.

The "wireless communication equipment" recited in the publication of unexamined Japanese patent application JP-A-5-129984 uses a configuration wherein filters and the like are shared between sending and receiving. Note that in comparison with the present invention to be presented below, the function of sharing filters between sending and receiving (e.g., frequency band) and its object differ from those of the present invention, and it also differs from the present invention on the point that it does not have the configuration of mixers and filters and combination of mixers used in the present invention.

However, with the configuration of the frequency conversion circuit for use in next-generation broadband FWA systems or the like as shown in FIG. 7 above, there is a cost-related problem in that the same number of SAW filters as the number of channels is required. Specifically, the example shown in FIG. 7 above shows the case of six channels, and in this case, six SAW filters are required for each of the sending system and the receiving system, thus causing the problem of higher cost and a larger unit. In addition, even though the configuration of frequency conversion is identical in the sending system and receiving system with the exception of the point that the direction of frequency conversion is different, it has two hardware systems, for the sending system and for the receiving system, so there is a problem in that hardware is redundant.

The present invention came about in order to solve the aforementioned problems in the prior art, and has as its object to provide wireless communication equipment with a more efficient configuration for performing the conversion between baseband signals on the baseband frequency and intermediate frequency signals on a plurality of intermediate frequencies, and also a FWA system configured using such wireless communication equipment.

More specifically, the present invention provides technology for reducing the number of SAW filters and other IF filters and technology for adopting common hardware for sending and receiving in the frequency conversion circuits of next-generation broadband FWA units and other wireless communication equipment that utilizes technology wherein a plurality of channels are placed on the frequency axis used in TDD communications technology and many wireless systems. Thereby, it is possible to reduce costs and minimize unit sizes.

SUMMARY OF THE INVENTION

To attain the above object, with the wireless communications equipment according to the present invention, at the time of wirelessly communicating signals on a plurality of communication frequencies, conversion between baseband signals on the baseband frequency and signals on a stipulated frequency higher than the baseband frequency and different from the intermediate frequency is performed based on the following configuration.

To wit, baseband frequency-side frequency conversion means performs conversion between baseband signals on the baseband frequency and signals on a stipulated frequency higher than the baseband frequency and different from the intermediate frequency, intermediate frequency-side frequency conversion means performs conversion between the signals on said stipulated frequency and intermediate frequency signals on a plurality of intermediate frequencies corresponding to a plurality of communication frequencies, and unwanted frequency signal component removal means removes signal components of unwanted frequencies from the signals on said stipulated frequency.

Specifically, in the sending process, the baseband frequency-side frequency conversion means converts the baseband signals to signals on said stipulated frequency; the unwanted frequency signal component removal means removes signal components of unwanted frequencies from the converted signals on said stipulated frequency, and the intermediate frequency-side frequency conversion means converts said cleaned signals to intermediate frequency signals. On the other hand, in the receiving process, the intermediate frequency-side frequency conversion means converts the intermediate frequency signals to signals on said stipulated frequency; the unwanted frequency signal component removal means removes signal components of unwanted frequencies from the converted signals on said stipulated frequency, and the baseband frequency-side frequency conversion means converts said cleaned signals to baseband signals.

Accordingly, because the unwanted frequency signal component removal means is shared for the intermediate frequency signals on a plurality of intermediate frequencies, the constitution regarding the removal of unwanted frequency signal components can be made more efficient and the cost and device size can be reduced in comparison to the prior art.

Note that the configuration of the present invention as described above may be applied to sending only, or may be applied to receiving only or may also be applied to both sending and receiving.

In addition, in a preferred embodiment of the present invention, the filter that processes the signals of said stipulated frequencies (function of removing signal components of unwanted frequencies) requires relatively narrowband filtering functions, but this can be achieved by sharing a single filter, and regarding the filters that process the intermediate frequency signals on a plurality of intermediate frequencies, one filter that has a relatively wideband filtering function can be shared. These can be achieved when said stipulated frequency is high in comparison to the baseband frequency. To wit, this is achieved by making the gap (=said stipulated frequency) between the local frequency and intermediate frequency used when obtaining the intermediate frequency signals of the intermediate frequency from signals on said stipulated frequency greater than that in the prior art.

Here, various equipment can be used as the wireless communications equipment.

In addition, various numbers can be used as the number of the plurality of communication frequencies.

In addition, various frequencies can be used as the plurality of communication frequencies.

For example, wireless frequencies used for wireless communication may be used as the plurality of communication frequencies, the number of the plurality of communication frequencies can be the same as the number of plurality of intermediate frequencies, and the intermediate frequency signals on each of the intermediate frequencies are converted to signals on the corresponding communication frequencies and sent wirelessly, while the signals on communication frequencies received wirelessly are converted to intermediate frequency signals on the corresponding intermediate frequencies.

In addition, various frequencies may be used as the baseband frequencies and a fixed frequency may be used, for example.

In addition, various frequencies can be used as the stipulated frequencies that are higher than the baseband frequency and different from the intermediate frequencies and a fixed frequency may be used, for example.

In addition, signal components of various frequencies may be used as the signal components of unwanted frequencies removed by the unwanted frequency signal component removal means. Specifically, spurious signal components or the like generated at the time of generation of signals on said stipulated frequency by means of the baseband frequency-side frequency conversion means or the intermediate frequency-side frequency conversion means may be used.

In addition, with the wireless communications equipment according to the present invention, the configuration related to frequency conversion may be shared between sending and receiving by means of the following configuration.

To wit, the baseband frequency-side frequency conversion means in the sending process and the intermediate frequency-side frequency conversion means in the receiving process are constituted using a common first mixer; the intermediate frequency-side frequency conversion means in the sending process and the baseband frequency-side frequency conversion means in the receiving process are constituted using a common second mixer; and the unwanted frequency signal component removal means in the sending process and the unwanted frequency signal component removal means in the receiving process are constituted using a common filter, In addition, the sending/receiving switching means performs switching between sending and receiving in time division.

Moreover, when switched to the sending process by the sending/receiving switching means, the first mixer is used to convert the baseband signals to signals on said stipulated frequency, the filter is used to remove from said converted signals those signal components on unwanted frequencies, and the second mixer is used to convert said cleaned signals to intermediate frequency signals on an intermediate frequency subject to sending among the plurality of intermediate frequencies. In addition, when switched to the receiving process by the sending/receiving switching means, the first mixer is used to convert the intermediate frequency signals received on an intermediate frequency among the plurality of intermediate frequencies to signals on said stipulated frequency, the filter is used to remove from said converted signals those signal components on unwanted frequencies, and the second mixer is used to convert said cleaned signals to baseband signals.

Accordingly, the configuration related to frequency conversion is shared between sending and receiving can be made more efficient and the cost and device size can be reduced in comparison to the prior art.

Here, the mode used for performing the switching between sending and receiving in time division by means of the sending/receiving switching means may be a mode in which the switching is performed according to the timing of the TDD scheme used in wireless communication by means of the wireless communication equipment, for example.

In addition, the intermediate frequencies for intermediate frequency signals subject to sending and the intermediate frequencies for intermediate frequency signals received may be one of the frequencies within a plurality of intermediate frequencies depending on the communication situation, for example. To wit, the intermediate frequencies for intermediate frequency signals subject to sending and the intermediate frequencies for intermediate frequency signals received may be one of the frequencies within a plurality of intermediate frequencies depending on the communication situation. Note that this may also be used in cases wherein intermediate frequency signals of two or more intermediate frequencies (signals of two or more communication frequencies) are communicated simultaneously.

In addition, with the wireless communications equipment according to the present invention, a matching circuit for sending that achieves matching with the circuit for sending connected to the mixer and a matching circuit for receiving that achieves matching with the circuit for receiving connected to the mixer is provided on at least one of the first mixer and the second mixer. To wit, it uses either one or both of a configuration wherein the first mixer is provided with a matching circuit for sending and a matching circuit for receiving, and a configuration wherein the second mixer is provided with a matching circuit for sending and a matching circuit for receiving.

Accordingly, in the case that the first mixer and second mixer are shared between sending and receiving, it is possible to achieve both matching to the circuit for sending and matching to the circuit for receiving, and thus both the sending process and receiving process may be optimized.

Here, matching circuits of various configurations can be used for the matching circuit for sending and the matching circuit for receiving.

In addition, the wireless communications equipment according to the present invention as described above may be applied to communications units (FWA units) that constitute next-generation broadband FWA systems, for example.

The FWA system according to the present invention consists of an indoor unit and outdoor unit connected via a coaxial cable, provided with a communications unit, where the communications unit has the following configuration.

To wit, the indoor unit constituting the communications unit comprises: the baseband frequency-side frequency conversion means, intermediate frequency-side frequency conversion means, and unwanted frequency signal component removal means provided in the wireless communications equipment according to the present invention.

Moreover, in the communications unit, in the sending process, the baseband frequency-side frequency conversion means converts the baseband signals to signals on said stipulated frequency, the unwanted frequency signal component removal means removes signal components of unwanted frequencies from the converted signals on said stipulated frequency, and the intermediate frequency-side frequency conversion means converts said cleaned signals to intermediate frequency signals. In addition, in the communications unit, in the receiving process, the intermediate frequency-side frequency conversion means converts the intermediate frequency signals to signals on said stipulated frequency, the unwanted frequency signal component removal means removes signal components of unwanted frequencies from the converted signals on said stipulated frequency, and the baseband frequency-side frequency conversion means converts said cleaned signals to baseband signals.

Here, various types of units may be used as the FWA system, communications units, indoor units, outdoor units and coaxial cable.

BRIEF EXPLANATION OF THE DRAWINGS

FIG. 4 is a diagram of an example of the relationship between the central frequency of an intermediate frequency signal and the local frequency according to Example 2 of the present invention.

DESCRIPTION OF THE PREFERRED EMBODIMENTS

Here follows a description of embodiments of the present invention made with reference to drawings.

We shall first describe Embodiment 1 of the present invention.

Figure 1:
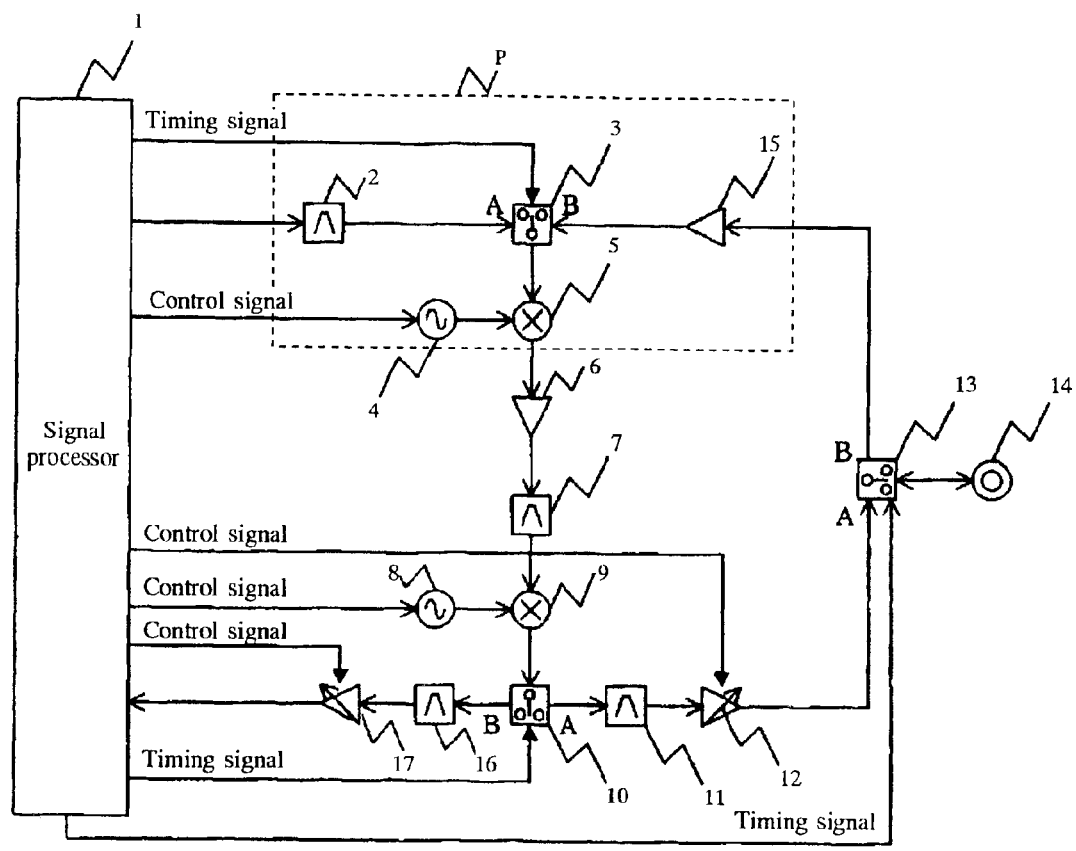
FIG. 1 is a diagram of an example of the constitution of a frequency conversion circuit according to Example 1 of the present invention.

FIG. 1 is a diagram of an example of the constitution of a frequency conversion circuit according to Example 1 of the present invention. This frequency conversion circuit is incorporated within an indoor unit that constitutes an FWA unit (communications unit) provided in a next-generation broadband FWA system, for example. In addition, the indoor unit may be connected to the outdoor unit via a coaxial cable, for example, so that the exchange of intermediate frequency signals with the outdoor unit is performed via coaxial cable.

The frequency conversion circuit according to this example shown in the figure consists of: a signal processor 1, band pass filter (BPF) 2, TDD switch 3, PLL (first PLL) 4, mixer (first mixer) 5, amplifier 6, SAW filter 7, PLL (second PLL) 8, mixer (second mixer) 9, TDD switch 10, broadband band pass filter (broadband BPF) 11, transmitter power controller 12, TDD switch 13, intermediate frequency (IF) signal input/output pin 14, amplifier 15, band pass filter (BPF) 16 and an automatic gain control (AGC) amplifier 17. Note that the IF signal input/output pin 14 is connected to a coaxial cable (not shown) and thus connected to an outside unit (not shown) via this coaxial cable.

Figure 2:
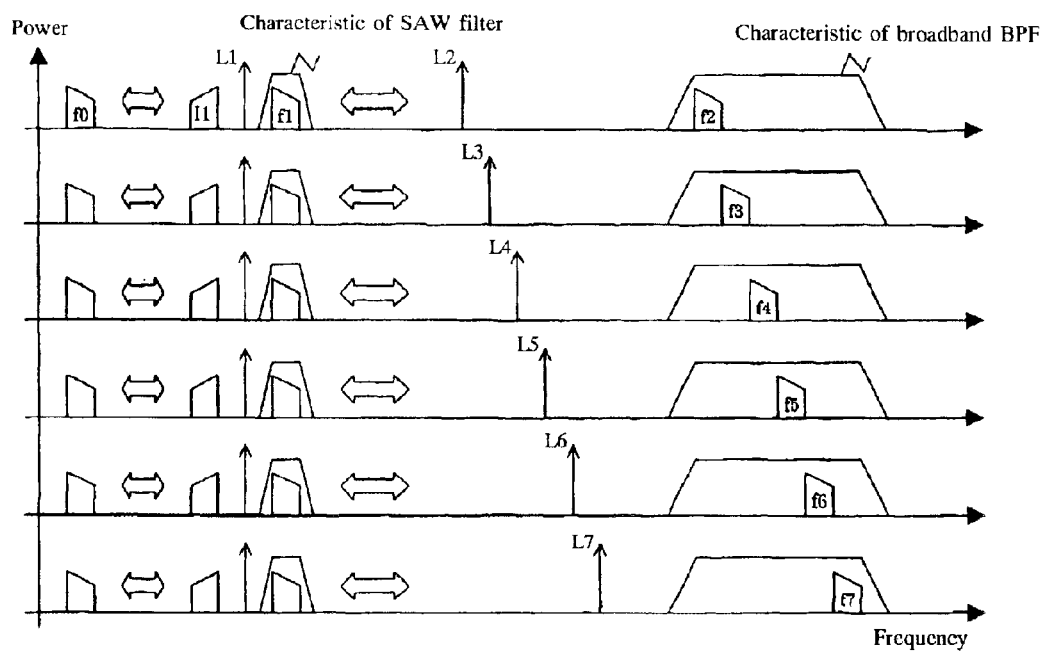
FIG. 2 is a diagram of an example of frequency conversion according to Example 1 of the present invention.

In addition, FIG. 2 shows an example of frequency conversion performed by the frequency conversion circuit shown in FIG. 1. In FIG. 2, the horizontal axis is the frequency and the vertical axis is the power. FIG. 2 shows the baseband signal at the baseband frequency $f_0$, signals at the stipulated frequency $f_1$, signals at the carrier leak frequency $L_1$ and signals at the image frequency $I_1$ corresponding to the stipulated frequency $f_1$, intermediate frequency signals at six intermediate frequencies $f_2$–$f_7$, and signals at carrier leak frequencies $L_2$–$L_7$. In addition, in FIG. 2, the signals at image frequencies $I_2$–$I_7$ are omitted from the figure. Note that $f_1=f_0+L_1$ and $I_1=L_1-f_0$. Note that for i=2–7, $f_i=f_1+L_i$ and $I_i=L_i-f_1$.

Note that in this example, as a preferred embodiment, the smallest frequency $f_2$ within the plurality of intermediate frequencies $f_2$–$f_7$ is larger than the local frequency $L_7$ corresponding to the largest frequency $f_7$, and a broadband BPF 11 is used to extract signals of frequencies from this smallest frequency $f_2$ to the largest frequency $f_7$. In addition, a narrowband filter is used as the SAW filter 7 in order to extract signals of the stipulated frequency $f_1$.

In the following description, we shall make reference to FIGS. 1 and 2 to illustrate one example of the operation of signal processing performed by the frequency conversion circuit shown in FIG. 1.

In the sending process, the signal processor 1 outputs the send signal (in this example, the baseband signal) on the central frequency $f_0$ to the BPF 2.

In addition, the signal processor 1 uses a control signal to control the first PLL 4 and second PLL 8 so that the first PLL 4 and second PLL 8 generate signals at the controlled frequency (in this example, one of $L_1$–$L_7$) which are output to the corresponding first mixer 5 and second mixer 9.

In addition, the signal processor 1 uses control signals to control the transmitter power controller 12 and AGC amplifier 17 and also uses timing signals to control the TbD switches 3, 10 and 13.

The send signal at the frequency of $f_0$ output from the signal processor 1 passes through the BPF 2 and is input to the TDD switch 3.

During sending, the signal processor 1 switches the TDD switch 3 to the A side (BPF 2 side). The send signal with a frequency of $f_0$ which passed through the TDD switch 3 is converted by the first mixer 5 to a signal on the central frequency $f_1$. In this case, from the first PLL 4 with the frequency set by the signal processor 1, the first mixer 5 adds to the signal on the frequency $f_0$ the local signal on the local frequency $L_1$ required for converting to the signal on the frequency $f_1$. Here, the relationship $f_1=f_0+L_1$ holds as described above.

The send signal converted to a signal on the central frequency f, by the first mixer 5 is amplified by the amplifier 6 and the SAW filter 7 removes the unnecessary carrier leak frequency $L_1$, image frequency 1, and other spurious signals.

The signal on the central frequency $f_1$ with the spurious signals removed is input to the second mixer 9 and the central frequency is converted to an intermediate frequency signal on one of the frequencies among the plurality of intermediate frequencies $f_2$–$f_7$. In this case, from the second PLL 8 with the frequency set by the signal processor 1, the second mixer 9 adds to the signal on the frequency f, the local signal on the local frequencies $L_2$–$L_7$ required for converting the signal on the frequency $f_1$ to the frequencies $f_2$–$f_7$. As, an example, when converting the signal on frequency $f_1$ to the signal on frequency $f_7$, a signal on the frequency $L_7$ is supplied and frequency conversion is performed using the relationship $f_7=f_1+L_7$.

The intermediate frequency signals on the intermediate frequencies $f_2$–$f_7$ obtained from the second mixer 9 are input to the TDD switch 10 and output to the broadband BPF 11.

Note that during sending, the signal processor 1 switches the TDD switch 10 to the A side (broadband BPF 11 side).

The broadband BPF 11 removes from the intermediate frequency signal those spurious signal components generated by the second mixer 9, and outputs this intermediate frequency signal after removal to the transmitter power controller 12.

Under the control of the signal processor 1, the transmitter power controller 12 sets the transmitter power for the send signal (in this example, the intermediate frequency signal) to the stipulated power and then outputs the send signal to the TDD switch 13.

During sending, the signal processor 1 switches the TDD switch 13 to the A side (transmitter power controller 12 side).

After passing through the TDD switch 13, the send signal is output to the IF signal input/output pin 14.

Here, the reason why spurious signal components can be removed by the broadband BPF 11 is because the send signal is first converted by the first mixer 5 to a sufficiently high frequency $f_1$, and for this reason, the filter used to remove spurious signals generated by the second mixer 9 need not necessarily have a steep characteristic such as that of a SAW filter, for example, but rather this can be handled with a broadband BPF which has a relatively gentle filtering characteristic. This point is one of the points that characterize this example.

On the other hand, in the receiving process, the received signal (here, the intermediate frequency signal) which has a central frequency of one of the plurality of intermediate frequencies $f_2$–$f_7$ is input from the IF signal input/output pin 14 to the TDD switch 13.

During receiving, the signal processor 1 switches the TDD switch 13 to the B side (amplifier 15 side) and switches the TDD switch 3 to the B side (amplifier 15 side). The received signal input from the IF signal input/output pin 14 passes through the TDD switch 13, is amplified by the amplifier 15 and then passes through the TDD switch 3 and is input to the first mixer 5.

From the first PLL 4 under the control of the signal processor 1, the first mixer 5 adds a local signal on one of the frequencies among the plurality of local frequencies $L_2$–$L_7$ in order to receive signals on the intermediate frequencies $f_2$–$f_7$. Thereby, the first mixer 5 converts the received signals on the on the intermediate frequencies $f_2$–$f_7$ to the stipulated frequency $f_1$.

The received signal that was frequency-converted to a signal on the frequency $f_1$ is amplified by amplifier 6, and after the spurious signal components are removed by the SAW filter 7, it is converted by the second mixer 9 to a baseband signal on the frequency $f_0$. In this case, from the second PLL 8, the second mixer 9 adds a local signal on the local frequency $L_1$ for converting the signal on the frequency $f_1$ to a signal on the frequency $f_0$.

During receiving, the signal processor 1 switches the TDD switch 10 to the B side (BPF 16 side). The received signal converted by the second mixer 9 to a baseband signal on the frequency $f_0$ passes through TDD switch 10, spurious signal components are removed by the BPF 16, the signal power value is set to the stipulated power value by the AGC amplifier 17 and then it is input to the signal processor 1 and processed.

As described above, with wireless communications equipment equipped with the frequency conversion circuit according to this example, when the sending and receiving of signals of a plurality of frequencies is performed and this sending and receiving is performed in time division, during sending, the digital quadrature modulated baseband signal on the baseband frequency $f_0$ is temporarily converted to a signal on a frequency $f_1$ separate from the intermediate frequencies $f_2$–$f_7$, and after the spurious signal components are removed from the converted signal, the cleaned signal is converted to an intermediate frequency signal on the target intermediate frequency $f_2$–$f_7$. On the other hand, during receiving, the received intermediate frequency signal on an intermediate frequency $f_2$–$f_7$ is temporarily converted to a signal on said separate frequency $f_1$ and after spurious signal components are removed from the converted signal, the cleaned signal is converted to a baseband signal on the target baseband frequency $f_0$ and digital quadrature detection is performed.

In addition, in the wireless communications equipment equipped with the frequency conversion circuit according to this example, by using the TDD switches 3, 10 and 13 to switch between the sending process and receiving process, the circuits for the mixers 5 and 9 and SAW filter 7 and the like can be shared among the sending and receiving systems.

More specifically, in the wireless communications equipment equipped with the frequency conversion circuit according to this example, with a configuration having a signal processor 1 that performs sending or receiving or transceiving by performing time division of the sending and receiving on a plurality of frequencies (plurality of channels), the signal processor 1 is connected to a circuit consisting of at least a first mixer 5, a second mixer 9 and a filter 7, and during sending, the first mixer 5 converts the baseband signal to a signal on a frequency $f_1$ separate from the intermediate frequencies $f_2$–$f_7$, the filter 7 removes spurious signal components from the signal on this separate frequency f, subjected to frequency conversion by the first mixer 5, and the second mixer 9 converts this cleaned signal on the separate frequency $f_1$ to an intermediate frequency signal on the desired one of the intermediate frequencies (channels) $f_2$–$f_7$. On the other hand, during receiving, the first mixer 5 converts the intermediate frequency signal on one of the intermediate frequencies (channels) $f_2$–$f_7$ to a signal on said separate frequency $f_1$, the filter 7 removes spurious signal components from the frequency-converted signal on said separate frequency $f_1$, and the second mixer 9 converts the cleaned signal on said separate frequency $f_1$ to a baseband signal on the desired baseband frequency $f_0$.

In addition, in the wireless communications equipment equipped with the frequency conversion circuit according to this example, in the aforementioned configuration, the circuits connected to the signal processor 1 are equipped with time division duplex switches (TDD switches) 3, 10 and 13, and by switching these TDD switches 3, 10 and 13 during sending and receiving, the first mixer 5, second mixer 9 and filter 7 can be shared between sending and receiving.

In addition, in the wireless communications equipment equipped with the frequency conversion circuit according to this example, as shown in FIG. 1, a sample configuration comprises: a signal processor 1 that performs the processing of the baseband signal, a filter 2 that performs the filtering of the baseband signal input from the signal processor 1, a switch 3 that connects the filter 2 to the first mixer 5 during sending and connects the amplifier 15 to the first mixer 5 during receiving, a first PLL 4 that supplies a local signal to the first mixer 5, a first mixer 5 that converts the filtered baseband signal input from the filter 2 via switch 3 or the amplified intermediate frequency signal input from the amplifier 15 via switch 3 to a signal on the stipulated frequency $f_1$, an amplifier 6 that amplifies said frequency-converted signal, a filter 7 that performs the filtering of the amplified signal, a second PLL 8 that supplies a local signal for the second mixer 9, a second mixer 9 that converts said filtered signal to an intermediate frequency signal during sending and to a baseband signal during receiving, a switch 10 that connects the filter 11 to the second mixer 9 during sending and connects the filter 16 to the second mixer 9 during receiving, a filter 11 that performs the filtering of the intermediate frequency signal input from the second mixer 9 via switch 10, a transmitter power controller 12 that controls the transmitter power of said filtered intermediate frequency signal, a switch 13 that connects the transmitter power controller 12 to the IF signal input/output pin 14 during sending and connects the amplifier 15 to the IF signal input/output pin 14 during receiving, an IF signal input/output pin 14 that outputs to the outside the intermediate frequency signal input from the transmitter power controller 12 via switch 13 and outputs to the amplifier 15 via switch 13 the intermediate frequency signal input from outside, an amplifier 15 that amplifies the intermediate frequency signal input from the IF signal input/output pin 14 via switch 13, a filter 16 that performs the filtering of the baseband signal input from the second mixer 9 via switch 10 and an amplifier 17 that controls the power of the filtered baseband signal and outputs the power-controlled baseband signal to the signal processor 1.

In addition, in this example, as a preferred embodiment, the case in which wireless communications equipment equipped with a frequency conversion circuit such as that shown above is applied to a next-generation broadband mesh-type FWA system is presented.

Specifically, the wireless communications equipment such as that shown above is applied to a FWA unit installed at an arbitrary location, and the electronic components that make up the indoor unit of the FWA unit are connected by coaxial cable to the outdoor unit, thereby constituting a FWA system. In this system, at the time that data sent from said indoor unit or data to be received by said indoor unit is subject to wireless communication by means of said outdoor unit, the conversion between the frequency of the baseband signal processed by said indoor unit and the frequency of the intermediate frequency signals flowing over the coaxial cable is performed in two stages.

Figure 7:
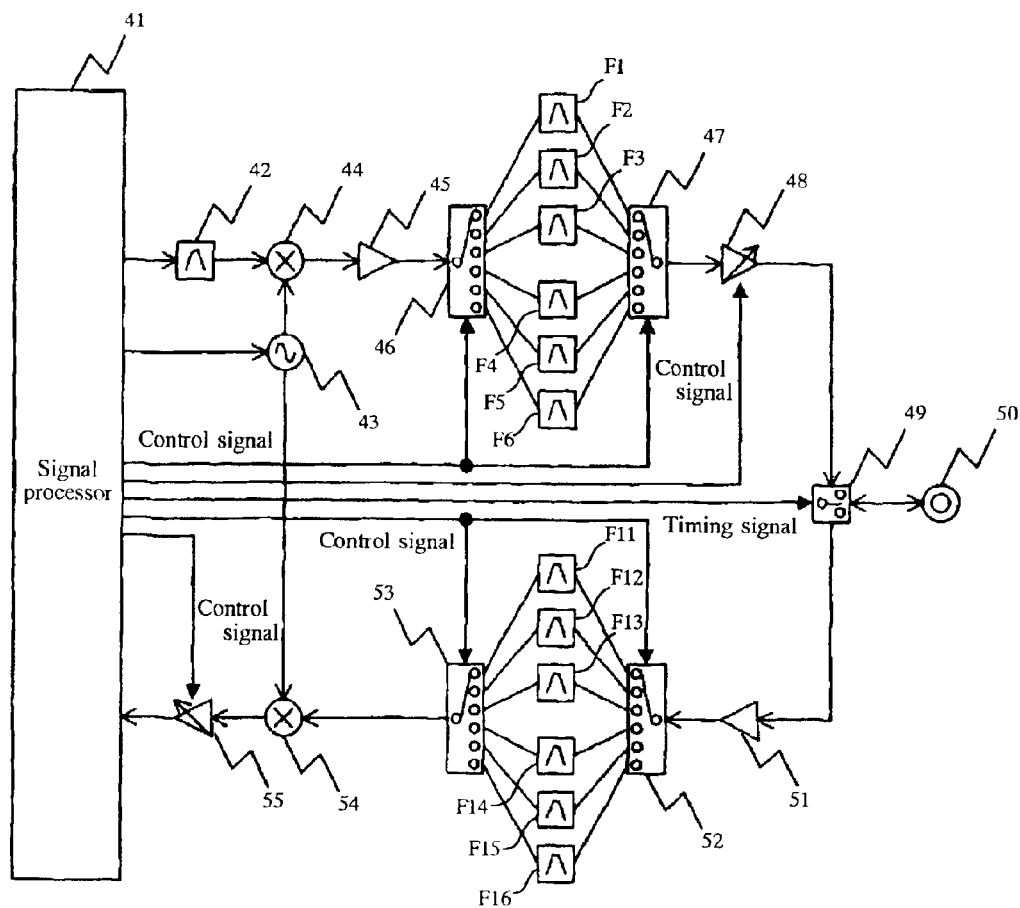
FIG. 7 is a diagram of an example of the constitution of a frequency conversion circuit according to the prior art.
Figure 8:
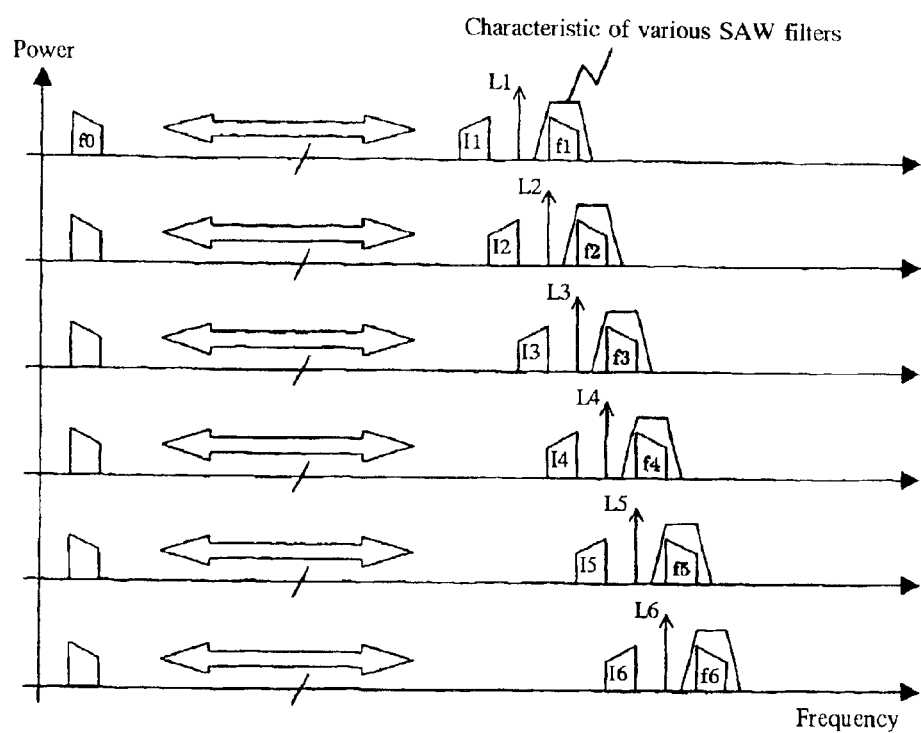
FIG. 8 is a diagram of an example of frequency conversion according to the prior art.

As described above, in the wireless communications equipment equipped with the frequency conversion circuit according to this example, where six SAW filters were required on both the sending side and receiving side, respectively, in the prior art as shown in FIG. 7 above, it is possible to get by with only one SAW filter by adding one extra frequency conversion stage.

In addition, in the wireless communications equipment equipped with the frequency conversion circuit according to this example, the sending and receiving systems can be shared by switching between sending and receiving with the TDD switches 3, 10 and 13.

In addition, in this example, as a preferred embodiment, the frequency conversion circuit as in this example can be applied to a frequency conversion circuit for the intermediate frequencies of a next-generation broadband FWA system. In such a FWA system, there would be no need to provide multiple SAW filters so the unit cost can be made extremely low, and by using TDD switches, it is possible to share hardware between the sending and receiving systems so it is possible to reduce costs and minimize the unit size.

In this manner, with the frequency conversion circuit according to this example, by performing the frequency conversion between the baseband signal and the intermediate frequency signal in two stages, it is possible to remove spurious signal components with a small number of SAW filters and also, by sharing a portion of the sending and receiving circuits, the circuit scale can be reduced. In addition, for example, in a configuration wherein the base station units of a FWA system are disposed in a lattice (mesh) shape, the frequency conversion circuit according to this example can be applied to technology whereby the transmission route from base station unit to base station unit is selected autonomously depending on the situation of radio-wave propagation.

Note that in the wireless communications equipment equipped with the frequency conversion circuit according to this example, in comparison to the prior-art frequency conversion circuit shown in FIG. 7 above, the number of SAW filters was reduced while increasing the number of mixers and PLLs by one each when looking at either the sending system or receiving system, but typically, in comparing the costs of SAW filters and mixers, a mixer is overwhelmingly less expensive, and a PLL can be constructed less expensively than a SAW filter, so the total cost of the configuration can be reduced. In addition, while the number of TDD switches increases when TDD switches are provided, the cost is typically overwhelmingly less than that of a SAW filter.

In addition, the known prior art includes, for example, technology wherein the so-called single superheterodyne configuration wherein frequency conversion is performed using mixers or the like in consideration of signals on the image frequency generated by frequency conversion with a local signal and spurious signals, or the double superheterodyne configuration (double conversion) used in case of the presence of frequencies that are unavoidable on the spurious chart is used to avoid unnecessary waves that fall within the service bandwidth. However, the technique in this example wherein the send signal or received signal is temporarily converted to a stipulated frequency other than the intermediate frequency and finally reconverted to a signal of the desired frequency with a mixer is thought to be novel.

Here, this example used a wireless communications scheme that has a plurality of channels upon the frequency axis and wireless communication is performed by means of the TDD scheme in the same frequency band.

In addition, in this example, the filter 7 that performs the filtering of the signal of the stipulated frequency f, may be, in a preferred embodiment, a SAW filter that has a steep filter band characteristic, but various filters may be used as long as they are filters that have a steep filter band characteristic.

In addition, this example presented an example of a configuration that combined two-stage frequency conversion technology using conversion between a fundamental frequency (baseband frequency) $f_0$ and a frequency (the stipulated frequency) $f_1$ higher than the fundamental frequency $f_0$ and technology for using TDD switches to share the sending and receiving systems. In this example, the timing for switching the three TDD switches 3, 10 and 13 is given by the signal processor 1, and the TDD switches 3, 10 and 13 perform the switch between sending and receiving. In addition, the two TDD switches 3 and 10 connected to the two mixers 5 and 9 are essentially allocated to multiple channels.

Note that in this example, the signal on a plurality of wireless frequencies transmitted wirelessly from the outdoor unit corresponds to a plurality of communication frequencies, the signal on the central frequency $f_0$ corresponds to the baseband signal on the baseband frequency, the signals on the plurality of central frequencies $f_2$–$f_7$ correspond to intermediate frequency signals on a plurality of intermediate frequencies and signals on the stipulated frequency $f_1$ correspond to signals on a frequency higher than the baseband frequency (namely, $f_0 < f_1$) and different from the intermediate frequency. Here, the signals of each of these frequencies are normally signals that have a band of frequencies (bandwidth).

In addition, in this example, regarding sending, the baseband frequency-side frequency conversion means is constituted by means of the functions of the first PLL 4 and mixer 5; the unwanted frequency signal component removal means is constituted by means of the functions of the filter 7; and the intermediate frequency-side frequency conversion means is constituted by means of the functions of the second PLL 8 and second mixer 9.

In addition, in this example, regarding sending, the intermediate frequency-side frequency conversion means is constituted by means of the functions of the first PLL 4 and mixer 5; the unwanted frequency signal component removal means is constituted by means of the functions of the filter 7; and the baseband frequency-side frequency conversion means is constituted by means of the functions of the second PLL 8 and second mixer 9.

In addition, in this example, the sending/receiving switching means is constituted by means of the signal processor 1 and TDD switches 3, 10 and 13.

Here follows a description of Example 2 of the present invention.

In this example, we shall describe the processing performed by the frequency conversion circuit illustrated in FIG. 1 above using specific examples of numerical values. Note that Example 1 above illustrates the case in which the intermediate frequencies constitute a six-channel (6CH) configuration, but this example is the case of a seven-channel (7CH) configuration.

Figure 3:
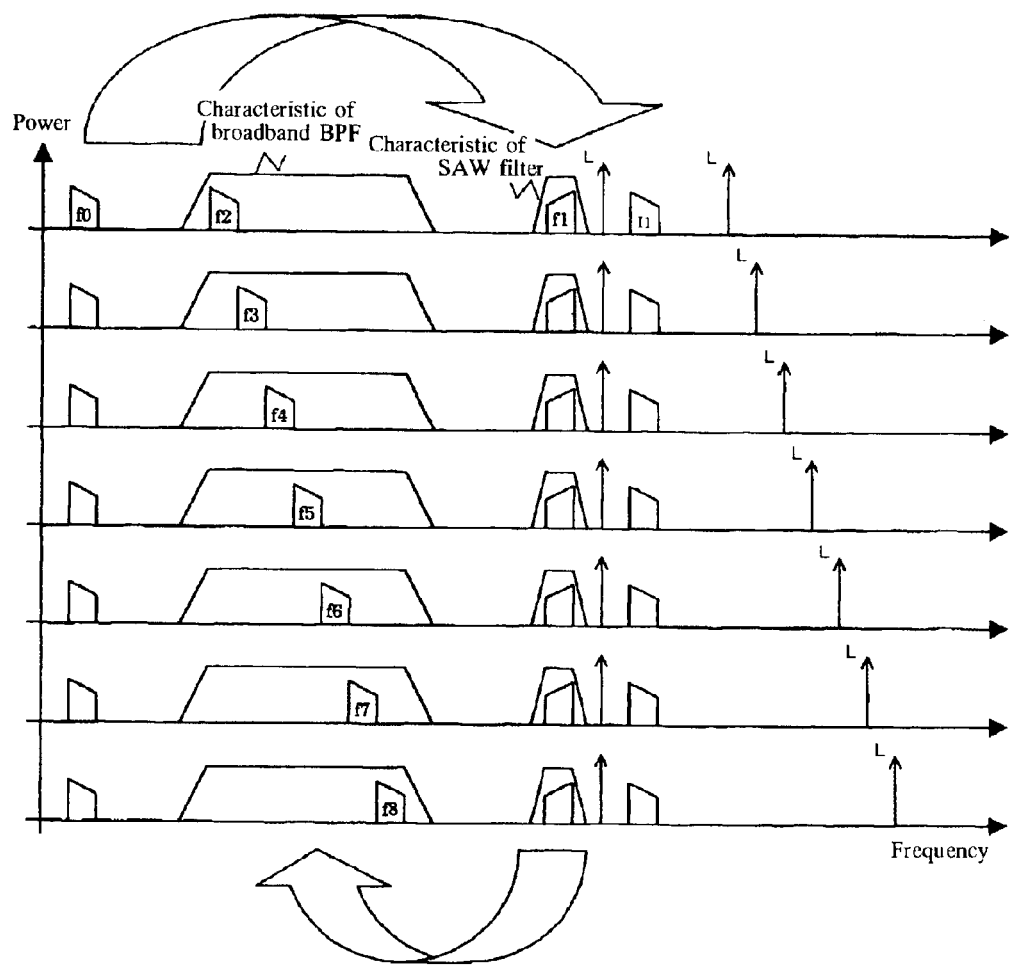
FIG. 3 is a diagram of an example of frequency conversion according to Example 2 of the present invention.

FIG. 3 shows an example of frequency conversion performed by the frequency conversion circuit according to this example. In FIG. 3, the horizontal axis is the frequency and the vertical axis is the power. FIG. 3 shows the baseband signal at the baseband frequency $f_0$, signals at the stipulated frequency $f_1$, signals at the carrier leak frequency $L_1$ and signals at the image frequency 1 corresponding to the stipulated frequency $f_1$, intermediate frequency signals at seven intermediate frequencies $f_2$–$f_8$ and signals at carrier leak frequencies $L_2$–$L_8$ corresponding to each of the intermediate frequency signals. In addition, in FIG. 3, the signals at image frequencies $I_2$–$I_8$ corresponding to each of the intermediate frequency signals are omitted from the figure. Note that $f_1 = L_1 - f_0$ and $I = L_1 + f_0$. In addition, for i=2–8, $f_i = L_1 - f_1$ and $I_1 = L_1 + f_1$.

Note that in this example, as a preferred embodiment, the smallest frequency $f_2$ within the plurality of intermediate frequencies $f_2$–$f_8$ is larger than the baseband frequency $f_0$, the largest frequency $f_8$ is smaller than the local frequency $L_2$ corresponding to the smallest frequency $f_2$, and a broadband BPF 11 is used to extract signals of frequencies from this smallest frequency $f_2$ to the largest frequency $f_8$. In addition, a narrowband filter is used as the SAW filter 7 in order to extract signals of the stipulated frequency $f_1$.

In this example, the baseband signal output from the signal processor 1 used is a 1024 QAM (Quadrature Amplitude Modulation) signal wave with a central frequency of 13.5 MHz, symbol rate of 6.75 Msps and bandwidth of approximately 8 MHz, which is bandwidth-limited with a root roll-off filter with α=0.3. This signal is generated by digital quadrature modulation with an 8× oversampling digital/analog converter (DAC), but spurious signals are generated in the vicinity of the DAC operating clock (CLK) frequency of 54 MHz. These spurious signals are removed by a BPF 2 with a central frequency of 13.5 MHz, pass bandwidth of 10 MHz and that can maintain attenuation of 60 dB or greater at the frequency of 54 MHz, and the cleaned signal is output to the TDD switch 3.

During sending, the TDD switches 3, 10 and 13 are all switched to the A side. The 13.5 MHz 1024 QAM signal passing through TDD switch 3 is input to the IF port of the first mixer 5, multiplied by the local signal of the first PLL 4 with its frequency set to $L_1$=338.5 MHz by means of the signal processor 1, and thus a $f_1=L_1-f_0$=338.5−13.5 MHz= 325 MHz signal is generated and output from the RF port of the first mixer 5.

In this case, in addition to the signal at the frequency $f_1$, the first mixer 5 generates a signal with a carrier leak frequency of $L_1$=338.5MHz, signal with an image frequency of $I_1$=338.5+13.5 MHz=325 MHz and other spurious signal components, so after amplifying all signal components at once by the amplifier 6 in order to compensate for mixer insertion losses, spurious signal removal is performed with the SAW filter 7 in order to remove spurious signals.

The filter used as the SAW filter 7 is a double-cascaded one with a central frequency of 325 MHz, a pass bandwidth of 10 MHz and attenuation of 40 dB at a point detuned by ±13.5 MHz from the central frequency, so that the attenuation of the blocked region is roughly 80 dB. The signal with the spurious signals removed by the SAW filter 7 is input to the RF port of the second mixer 9, and, if necessary, frequency-converted to a signal on one of the intermediate frequencies within the 7CH intermediate frequency band in the vicinity the ultimate target of 140 MHz. If necessary, the second mixer 9 is supplied by the second PLL 8 with a local signal on the local frequencies $L_2-L_8$ required to obtain the intermediate frequency signal of each channel.

Here, FIG. 4 illustrates, for channels 1–7, one example of the relationship between the central frequencies (in this example, intermediate frequencies) $f_2-f_8$ of the intermediate frequency signals and the local frequencies $L_2-L_8$, using examples of specific values.

The 1024 QAM send signal frequency-converted by the second mixer 9 to one of the intermediate frequencies in the 7CH intermediate frequency band passes through the TDD switch 10. Spurious signals are removed by the BPF 11 with a central frequency of 140 MHz and pass bandwidth of 80 MHz and then the signal is set to the stipulated power by the transmitter power controller 12 and then output from the IF signal input/output pin 14 via the TDD switch 13.

As described above, the circuit shown in FIG. 1 above is typically installed in an indoor unit (indoor device) and connected by a coaxial cable to an outdoor unit (outdoor device). In the outdoor unit, the send signal with a central frequency near 140 MHz output from the IF signal input/ output pin 14 and transmitted via the coaxial cable is frequency-converted to a 26 GHz millimeter-wave band signal and then the frequency-converted signal has its power amplified and is output wirelessly from the antenna.

On the other hand, in the receiving operation, a signal in the 26 GHz band propagating through space is received by the outdoor unit is frequency-converted to an intermediate frequency signal near 140 MHz and this intermediate frequency signal propagates through the coaxial cable and is input to the IF signal input/output pin 14 of the indoor unit. Moreover, this intermediate frequency signal passes through the TDD switch 13 switched to the B side, is amplified by the amplifier 15 and is input to the IF pin of the first mixer 5 via TDD switch 3.

Here, during sending, the input signal to the IF pin of the first mixer 5 was a 13.5 MHz baseband signal, but during receiving, the TDD switch 3 is switched so it becomes the received signal near 140 MHz. In addition, during sending, in order for the 13.5 MHz signal to be converted to a 325 MHz signal, a 338.5 MHz signal is supplied as the local signal from the first PLL 4 to the first mixer 5, but during receiving, in order for the signal on one of channels 1 through 7 near 140 MHz to be converted to a 325 MHz signal in the first mixer 5, a local signal with a local frequency of $L_2-L_8$ is supplied from the first PLL 4 to the first mixer 5 as shown in FIG. 4 above, for example.

The 325 MHz signal output from the first mixer 5 is amplified by the amplifier 6 and the SAW filter 7 cuts off only the signal components of the stipulated channel, and thus the signal components in question are output to the RF port of the second mixer 9.

In the second mixer 9, the 325 MHz is converted to a 13.5 MHz baseband signal and in this case, a 338.5 MHz local signal is supplied from the second PLL 8 to the second mixer 9. The received signal converted by the second mixer 9 to a 13.5 MHz signal passes through the TDD switch 10, spurious signals are removed by the BPF 16 with a central frequency of 13.5 MHz and pass bandwidth of 10 MHz, and then it is set to the stipulated power by the AGC amplifier 17 and input to the signal processor 1 and demodulated.

As described above, in wireless communications equipment equipped with the frequency conversion circuit according to this example, the hardware in the portion of the configuration related to the 325 MHz used in sending and receiving is shared between sending and receiving, and portions of the configuration other than this portion has a configuration such that they can be isolated or selected by means the TDD switches 3, 10 and 13. In addition, by providing a frequency conversion stage that performs the first frequency conversion of the send signal or receive signal to the 325 MHz frequency other than near the vicinity of the intermediate frequency of 140 MHz, it is possible to get by with one SAW filter instead of the seven SAW filters required in the prior art, for example.

Note that by sharing hardware between sending and receiving, there are conceivable cases wherein the interference between sending and receiving and the response in switching between sending and receiving is improved, but regarding interference between sending and receiving, this can be handled adequately by improving the isolation characteristics of the TDD switches, for example. In addition, regarding the response in switching between sending and receiving, this can be handled by providing, if necessary, an interval with no signals sent (called "guard time") within the frame configuration of the communication signals. As one example, in next-generation broadband FWA units, sending and receiving is performed within the frame period of 2 ms, and at this time, guard time of approximately 20 μs is prepared.

In addition, in this example, the frequency conversion of signals involves performing frequency conversion between 13.5 MHz and 325 MHz and between this 325 MHz and the vicinity of 140 MHz, and the point that, in the sending process, the baseband signal is first converted to a signal at 325 MHz, higher than the intermediate frequency signals near the target of 140 MHz differs from the case of frequency conversion illustrated in FIG. 2 above. Note that it is preferable to perform a study of the spurious signals generated in each mixer and take adequate consideration to prevent deterioration of the carrier-to-noise ratio (CNR) of the main signal.

Here follows a description of Example 3 of the present invention.

In this example, we illustrate another example of the circuit configuration in the vicinity of the first mixer 5 and second mixer 9 provided in the frequency conversion circuit illustrated in FIG. 1.

In the area of the first mixer 5 and second mixer 9, the TDD switches 3 and 10 switch the IF port input on the send/receive timing in the case of the first mixer 5, and switch the IF port output on the send/receive timing in the case of second mixer 9, but in this case, the problem of matching occurs.

As one example, focusing on the first mixer 5, preferably, it is necessary for the IF port of the first mixer 5 to be matched with filter 2 when the TDD switch 3 is switched to the A side, and it is necessary for the IF port of the first mixer 5 to be matched with amplifier 15 when the TDD switch 3 is switched to the B side. In addition, the impedance of the various components is typically different, so it is necessary for matching to be performed with respect to the respective frequencies.

Figure 5:
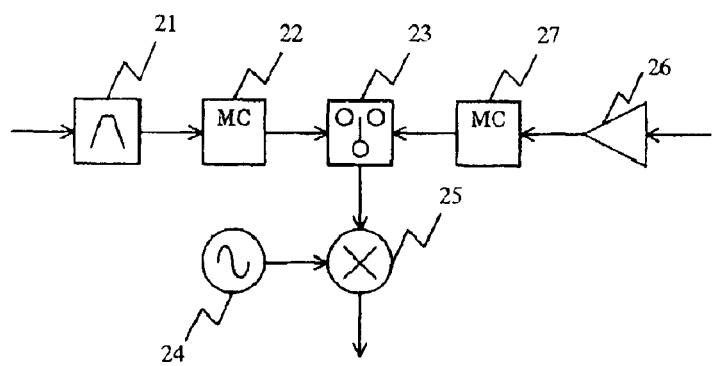
FIG. 5 is a diagram of an example of the constitution of a frequency conversion circuit according to Example 3 of the present invention.

FIG. 5 shows an example of the circuit configuration achieved by performing the aforementioned matching with respect to the constituent portion P indicated by dotted lines for the first mixer 5 in the frequency conversion circuit shown in FIG. 1 above.

FIG. 5 shows, as another example of the circuit configuration of the aforementioned constituent portion P, a BPF 21, matching circuit (MC) 22 for the sending circuit side, TDD switch 23, first PLL 24, first mixer 25, amplifier 26 and a matching circuit (MC) 27 for the receiving circuit side.

Here, the circuit configuration according to this example shown in the figure is identical to the circuit configuration of the constituent portion P shown in FIG. 1 above, with the exception of the matching circuit 22 for the sending process provided between the BPF 21 and TDD switch 23 and the matching circuit 27 for the receiving process provided between the amplifier 26 and TDD switch 23.

The matching circuit 22 on the sending circuit side has functions for achieving matching between the first mixer 25 and the BPF 21 during sending, and the matching circuit 27 on the receiving circuit side has functions for achieving matching between the first mixer 25 and amplifier 26 during receiving. In a configuration equipped with the matching circuits 22 and 27, it is possible to achieve matching with the matching circuits 22 and 27 by switching the TDD switch 23 to the A side or B side, respectively, in advance, so matching can be maintained even in cases in which the TDD switch 23 is switched and the destination of connection of the IF port of the first mixer 25 is changed to a different system (sending system or receiving system).

Note that this example is described in detail with regard to the first mixer 5 shown in FIG. 1 above, but a similar meritorious effect can be obtained with a similar configuration for the second mixer 9 shown in FIG. 1 above.

As described above, in wireless communications equipment equipped with the frequency conversion circuit according to this example, matching circuits are provided in the sending system and receiving system connected to the first mixer 5 and second mixer 9 shown in FIG. 1 above, thus giving a configuration wherein the signal subject to processing is input via said matching circuits to the first mixer 5 or second mixer 9, and thus matching to the mixer can be maintained.

Note that in this example, the matching circuit for sending is constituted by means of the matching circuit 22 and the matching circuit for receiving is constituted by means of the matching circuit 27.

Here follows a description of Example 4 of the present invention.

In this example, we illustrate another example of the circuit configuration in the vicinity of the first mixer 5 and second mixer 9 provided in the frequency conversion circuit illustrated in FIG. 1.

In this example, we present an example of a measure to improve the isolation of the sending system and receiving system.

Figure 6:
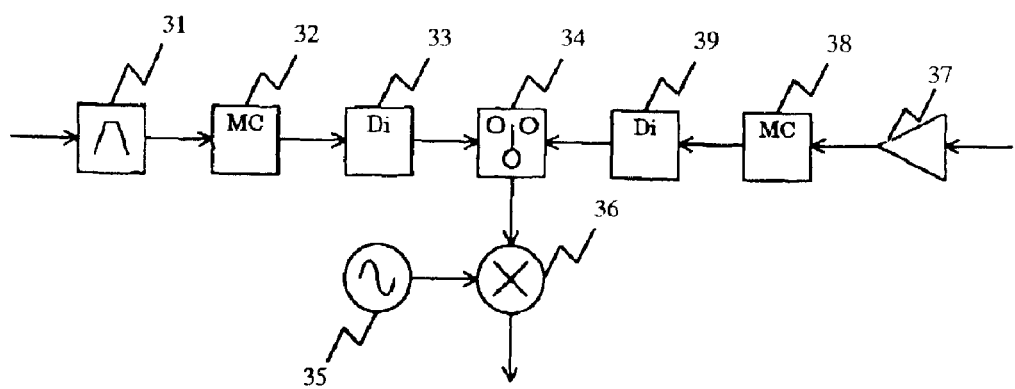
FIG. 6 is a diagram of an example of the constitution of a frequency conversion circuit according to Example 4 of the present invention.

FIG. 6 shows an example of the circuit configuration achieved by improving isolation as described above with respect to the constituent portion P indicated by dotted lines for the first mixer 5 in the frequency conversion circuit shown in FIG. 1 above.

FIG. 6 shows, as another example of the circuit configuration of the aforementioned constituent portion P, a BPF 31, matching circuit (MC) 32 for the sending circuit side, diode (Di) 33 for the sending circuit side, TDD switch 34, first PLL 35, first mixer 36, amplifier 37, matching circuit (MC) 38 for the receiving circuit side and a diode (Di) 39 for the receiving circuit side.

Here, the circuit configuration according to this example shown in the figure is identical to the circuit configuration of the constituent portion P shown in FIG. 5 above, with the exception of the diode 33 for the sending process provided between the matching circuit 32 and TDD switch 34 and the diode 39 for the receiving process provided between the matching circuit 38 and TDD switch 34.

As described above, in this example, the diodes 32 and 39 are inserted into the circuits for sending and circuits for receiving, respectively, and when a bias is applied to the diodes 32 and 39 the property of a harmonic signal turning on is utilized. Specifically, the signal processor 1 exerts control during sending so that a bias is applied to the diode 33 for the sending process and a bias is not applied to the diode 33 for the receiving process, so the isolation of the TDD switch 34 alone is added to the isolation of the diode 39, thus increasing the total isolation. Similarly, during receiving, a bias is applied to the diode 39 for the receiving process and a bias is not applied to the diode 33 for the sending process, thus increasing isolation.

Note that this example is described in detail with regard to the first mixer 5 shown in FIG. 1 above, but a similar meritorious effect can be obtained with a similar configuration for the second mixer 9 shown in FIG. 1 above.

As described above, in wireless communications equipment equipped with the frequency conversion circuit according to this example, matching circuits 32 and 38 are provided in the sending system and receiving system connected to the first mixer 5 and second mixer 9 shown in FIG. 1 above, and also the diodes 33 and 39 are provided on both ends of the TDD switch 34, so the isolation characteristics of the sending system and receiving system can be improved.

To wit, as one example, a sending circuit-side isolation assurance means for assuring isolation is provided on the circuit for sending connected to the mixer is provided on at least one of the first mixer and the second mixer and a receiving circuit-side isolation assurance means for assuring isolation is provided on the circuit for receiving connected to the mixer is provided are provided. Note that the sending circuit-side isolation assurance means for assuring isolation and receiving circuit-side isolation assurance means for assuring isolation may be constituted using diodes, for example.

Here, the configuration of the wireless communications equipment and FWA system or the like according to the present invention is not necessarily limited to that illustrated above, but rather various configurations may be used. Note that the present invention may also provide a method for executing the processing according to the present invention or a computer program for achieving such a method.

In addition, the field of application of the present invention is not necessarily limited to that illustrated above, but rather the present invention may be applied to various fields. For example, the technology according to the present invention may be applied not only to a FWA system but also various communications systems that perform wireless communication or wired communication.

In addition, the various processing performed in the wireless communications equipment or FWA system according to the present invention may be constituted by being implemented in hardware resources equipped with a processor and memory and the like, for example, being controlled by means of a processor executing a control program stored in read-only memory (ROM). In addition, the various functional means for executing this processing may also be constituted as independent hardware circuits.

In addition, the present invention may also be understood as one wherein the above control program (itself) is stored in a floppy disc®, CD-ROM or other computer-readable recording media, so that the processing according to the present invention can be implemented by loading said control program from the recording medium into a computer and executing the program by a processor.

As described above, with the wireless communications equipment according to the present invention, when the communication of signals on a plurality of communication frequencies is performed wirelessly, conversion is performed between baseband signals on the baseband frequency and signals on a stipulated frequency higher than the baseband frequency and different from the intermediate frequency, and also, conversion is performed between the signals on said stipulated frequency and intermediate frequency signals on a plurality of intermediate frequencies corresponding to a plurality of communication frequencies, and in this case, signal components of unwanted frequencies are removed from the signals on said stipulated frequency, so it is possible to share the configuration regarding the removal of unwanted frequency signal components for the intermediate frequency signals of a plurality of intermediate frequencies, and thus the cost and unit size can be reduced in comparison to the prior art.

In addition, with the wireless communications equipment according to the present invention, the baseband frequency-side frequency conversion in the sending process and the intermediate frequency-side frequency conversion in the receiving process can be performed using a common first mixer; the intermediate frequency-side frequency conversion in the sending process and the baseband frequency-side frequency conversion in the receiving process can be performed using a common second mixer; and the unwanted frequency signal component removal in the sending process and the unwanted frequency signal component removal in the receiving process can be performed using a common filter in this configuration, so by performing switching in time division between the sending process and receiving process, the configuration related to frequency conversion can be shared between the sending process and receiving process, and thus the cost and unit size can be reduced in comparison to the prior art.

What is claimed is:

1. Wireless communications equipment that wirelessly communicates signals on a plurality of communication frequencies, comprising:

baseband frequency-side frequency conversion means that performs conversion between baseband signals on the baseband frequency and signals on a stipulated frequency higher than the baseband frequency and different from an intermediate frequency;

intermediate frequency-side frequency conversion means that performs conversion between the signals on said stipulated frequency and intermediate frequency signals on a plurality of intermediate frequencies corresponding to a plurality of communication frequencies; and unwanted frequency signal component removal means that removes signal components of unwanted frequencies from the signals on said stipulated frequency.

2. The wireless communications equipment according to claim 1, wherein:

the baseband frequency-side frequency conversion means in the sending process and the intermediate frequency-side frequency conversion means in the receiving process are constituted using a common first mixer; the intermediate frequency-side frequency conversion means in the sending process and the baseband frequency-side frequency conversion means in the receiving process are constituted using a common second mixer; and the unwanted frequency signal component removal means in the sending process and the unwanted frequency signal component removal means in the receiving process are constituted using a common filter, further comprising:

sending/receiving switching means that performs switching between sending and receiving in time division, wherein:

when switched to the sending process by the sending/receiving switching means, the first mixer is used to convert the baseband signals to signals on said stipulated frequency, the filter is used to remove from said converted signals those signal components on unwanted frequencies, and the second mixer is used to convert said cleaned signals to intermediate frequency signals on an intermediate frequency subject to sending among the plurality of intermediate frequencies, and when switched to the receiving process by the sending/receiving switching means, the first mixer is used to convert the intermediate frequency signals received on an intermediate frequency among the plurality of intermediate frequencies to signals on said stipulated frequency, the filter is used to remove from said converted signals those signal components on unwanted frequencies, and the second mixer is used to convert said cleaned signals to baseband signals.

3. The wireless communications equipment according to claim 2, further comprising:
a matching circuit for sending that achieves matching with the circuit for sending connected to the mixer and a matching circuit for receiving that achieves matching with the circuit for receiving connected to the mixer is provided on at least one of the first mixer and the second mixer.

4. The wireless communications equipment according to claim 1, further comprising:
a signal processor that performs the processing of the baseband signal;
a first filter that performs the filtering of the baseband signal input from the signal processor;
a first switch that connects the first filter to the first mixer during sending and connects the first amplifier to the first mixer during receiving;
a first PLL that supplies a local signal to the first mixer;
a first mixer that converts the filtered baseband signal input from the first filter via the first switch or the amplified intermediate frequency signal input from the first amplifier via the first switch to a signal on the stipulated frequency;
a second amplifier that amplifies said frequency-converted signal;
a second filter that performs the filtering of the amplified signal;
a second PLL that supplies a local signal for the second mixer;
a second mixer that converts said filtered signal to an intermediate frequency signal during sending and to a baseband signal during receiving;
a second switch that connects a third filter to the second mixer during sending and connects a fourth filter to the second mixer during receiving;
a third filter that performs the filtering of the intermediate frequency signal input from the second mixer via the second switch;
a transmitter power controller that controls the transmitter power of said filtered intermediate frequency signal;
a third switch that connects the transmitter power controller to the IF signal input/output pin during sending and connects the first amplifier to the IF signal input/output pin during receiving;
an IF signal input/output pin that outputs to the outside the intermediate frequency signal input from the transmitter power controller via the third switch and outputs to the first amplifier via the third switch the intermediate frequency signal input from outside;
a first amplifier that amplifies the intermediate frequency signal input from the IF signal input/output pin via the third switch;
a fourth filter that performs the filtering of the baseband signal input from the second mixer via the second switch; and
a third amplifier that controls the power of the filtered baseband signal and outputs said power-controlled baseband signal to the signal processor.

5. The wireless communications equipment according to claim 1, wherein:
in the sending process, the baseband frequency-side frequency conversion means converts the baseband signals to signals on said stipulated frequency, the unwanted frequency signal component removal means removes signal components of unwanted frequencies from the converted signals on said stipulated frequency, and the intermediate frequency-side frequency conversion means converts said cleaned signals to intermediate frequency signals.

6. The wireless communications equipment according to claim 1, wherein:
in the receiving process, the intermediate frequency-side frequency conversion means converts the intermediate frequency signals to signals on said stipulated frequency, the unwanted frequency signal component removal means removes signal components of unwanted frequencies from the converted signals on said stipulated frequency, and the baseband frequency-side frequency conversion means converts said cleaned signals to baseband signals.

7. The wireless communications equipment according to claim 1, wherein:
the smallest frequency within the plurality of intermediate frequencies is larger than the local frequency corresponding to the largest frequency,
as the unwanted frequency signal component removal means, a narrowband SAW filter is used to extract signals of said stipulated frequency, and
a broadband BPF filter is used to extract signals of frequencies from said smallest frequency to said largest frequency.

8. The wireless communications equipment according to claim 1, wherein:
the smallest frequency within the plurality of intermediate frequencies is larger than the baseband frequency, and the largest frequency is smaller than the local frequency corresponding to said smallest frequency,
as the unwanted frequency signal component removal means, a narrowband SAW filter is used to extract signals of said stipulated frequency, and
a broadband BPF filter is used to extract signals of frequencies from said smallest frequency to said largest frequency.

9. The wireless communications equipment according to claim 3, further comprising:
a sending circuit-side isolation assurance means for assuring isolation provided on the circuit for sending connected to the mixer provided on at least one of the first mixer and the second mixer, and a receiving circuit-side isolation assurance means for assuring isolation provided on the circuit for receiving connected to the mixer.

10. A FWA system constituting an indoor unit and outdoor unit connected via a coaxial cable and provided with a communications unit that communicates signals on a plurality of communication frequencies, wherein:
the indoor unit constituting the communications unit comprises: baseband frequency-side frequency conversion means that performs conversion between baseband signals on the baseband frequency and signals on a stipulated frequency higher than the baseband frequency and different from an intermediate frequency, intermediate frequency-side frequency conversion means that performs conversion between the signals on said stipulated frequency and intermediate frequency signals on a plurality of intermediate frequencies corresponding to a plurality of communication frequencies, and unwanted frequency signal component removal means that removes signal components of unwanted frequencies from the signals on said stipulated frequency, and in the communications unit, in the sending process, the indoor unit converts the baseband signals to intermediate frequency signals and sends the intermediate frequency signals to the outdoor unit via a coaxial cable, and the outdoor unit receives the intermediate frequency signals and converts the intermediate frequency signals to radio frequency signals and wirelessly transmits the radio frequency signals, and in the communications unit, in the receiving process, the outdoor unit converts received radio frequency signals to intermediate frequency signals and sends the intermediate frequency signals to the indoor unit via a coaxial cable, and the indoor unit receives the intermediate frequency signals and converts the intermediate frequency signals to baseband signals.

11. The FWA system according to claim 10, wherein:

in the indoor unit constituting the communications unit, the baseband frequency-side frequency conversion means in the sending process and the intermediate frequency-side frequency conversion means in the receiving process are constituted using a common first mixer; the intermediate frequency-side frequency conversion means in the sending process and the baseband frequency-side frequency conversion means in the receiving process are constituted using a common second mixer; and the unwanted frequency signal component removal means in the sending process and the unwanted frequency signal component removal means in the receiving process are constituted using a common filter, further comprising:

sending/receiving switching means that performs switching between sending and receiving in time division, wherein:

when switched to the sending process by the sending/receiving switching means, the first mixer is used to convert the baseband signals to signals on said stipulated frequency, the filter is used to remove from said converted signals those signal components on unwanted frequencies, and the second mixer is used to convert said cleaned signals to intermediate frequency signals on an intermediate frequency subject to sending among the plurality of intermediate frequencies, and when switched to the receiving process by the sending/receiving switching means, the first mixer is used to convert the intermediate frequency signals received on an intermediate frequency among the plurality of intermediate frequencies to signals on said stipulated frequency, the filter is used to remove from said converted signals those signal components on unwanted frequencies, and the second mixer is used to convert said cleaned signals to baseband signals.

12. The FWA system according to claim 11, wherein:

in the indoor unit constituting the communications unit, a matching circuit for sending that achieves matching with the circuit for sending connected to the mixer and a matching circuit for receiving that achieves matching with the circuit for receiving connected to the mixer is provided on at least one of the first mixer and the second mixer.

13. The FWA system according to claim 10, wherein:

the indoor unit constituting the communications unit comprises:

a signal processor that performs the processing of the baseband signal;

a first filter that performs the filtering of the baseband signal input from the signal processor;

a first switch that connects the first filter to the first mixer during sending and connects the first amplifier to the first mixer during receiving;

a first PLL that supplies a local signal to the first mixer;

a first mixer that converts the filtered baseband signal input from the first filter via the first switch or the amplified intermediate frequency signal input from the first amplifier via the first switch to a signal on the stipulated frequency;

a second amplifier that amplifies said frequency-converted signal;

a second filter that performs the filtering of the amplified signal;

a second PLL that supplies a local signal for the second mixer;

a second mixer that converts said filtered signal to an intermediate frequency signal during sending and to a baseband signal during receiving;

a second switch that connects a third filter to the second mixer during sending and connects a fourth filter to the second mixer during receiving;

a third filter that performs the filtering of the intermediate frequency signal input from the second mixer via the second switch;

a transmitter power controller that controls the transmitter power of said filtered intermediate frequency signal;

a third switch that connects the transmitter power controller to the IF signal input/output pin during sending and connects the first amplifier to the IF signal input/output pin during receiving;

an IF signal input/output pin that outputs to the outside the intermediate frequency signal input from the transmitter power controller via the third switch and outputs to the first amplifier via the third switch the intermediate frequency signal input from outside;

a first amplifier that amplifies the intermediate frequency signal input from the IF signal input/output pin via the third switch;

a fourth filter that performs the filtering of the baseband signal input from the second mixer via the second switch; and a third amplifier that controls the power of the filtered baseband signal and outputs said power-controlled baseband signal to the signal processor.

14. The FWA system according to claim 10, wherein:

in the indoor unit constituting the communications unit, in the sending process, the baseband frequency-side frequency conversion means converts the baseband signals to signals on said stipulated frequency, the unwanted frequency signal component removal means removes signal components of unwanted frequencies from the converted signals on said stipulated frequency, and the intermediate frequency-side frequency conversion means converts said cleaned signals to intermediate frequency signals.

15. The FWA system according to claim 10, wherein:

in the indoor unit constituting the communications unit, in the receiving process, the intermediate frequency-side frequency conversion means converts the intermediate frequency signals to signals on said stipulated frequency, the unwanted frequency signal component removal means removes signal components of unwanted frequencies from the converted signals on said stipulated frequency, and the baseband frequency-side frequency conversion means converts said cleaned signals to baseband signals.

16. The FWA system according to claim 10, wherein:

in the indoor unit constituting the communications unit, the smallest frequency within the plurality of intermediate frequencies is larger than the local frequency corresponding to the largest frequency, as the unwanted frequency signal component removal means, a narrowband SAW filter is used to extract signals of said stipulated frequency, and a broadband BPF filter is used to extract signals of frequencies from said smallest frequency to said largest frequency.

17. The FWA system according to claim 10, wherein:

in the indoor unit constituting the communications unit, the smallest frequency within the plurality of intermediate frequencies is larger than the baseband frequency, and the largest frequency is smaller than the local frequency corresponding to said smallest frequency, as the unwanted frequency signal component removal means, a narrowband SAW filter is used to extract signals of said stipulated frequency, and a broadband BPF filter is used to extract signals of frequencies from said smallest frequency to said largest frequency.

18. The FWA system according to claim 12, wherein:

the indoor unit constituting the communications unit comprises:

a sending circuit-side isolation assurance means for assuring isolation provided on the circuit for sending connected to the mixer provided on at least one of the first mixer and the second miser, and a receiving circuit-side isolation assurance means for assuring isolation provided on the circuit for receiving connected to the mixer.

* * * * *